C. J. FORD.
MOUNTING FOR SHOCK ABSORBERS.
APPLICATION FILED APR. 19, 1919.
1,374,997. Patented Apr. 19, 1921.
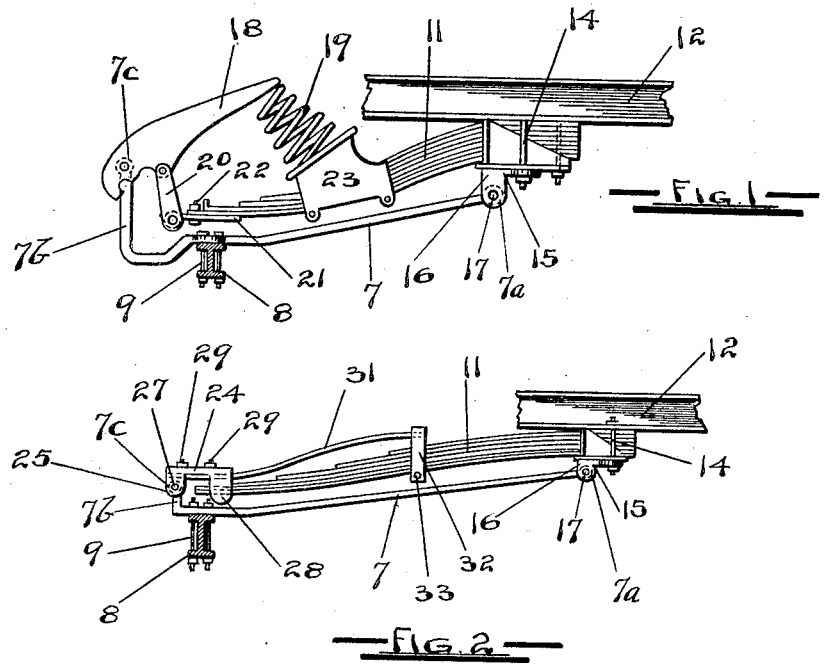
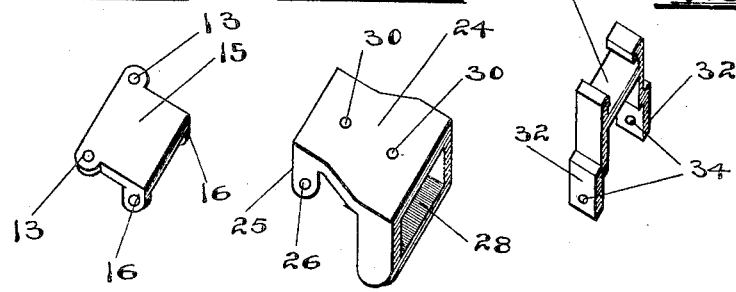
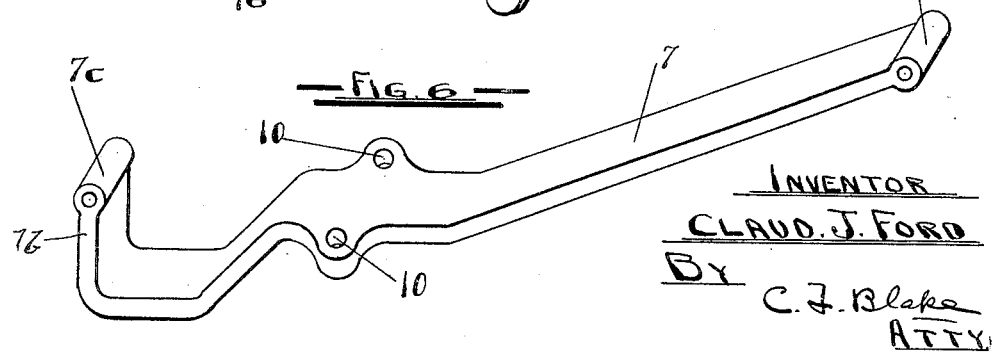
INVENTOR
CLAUD. J. FORD
BY C. J. Blake
ATTY.

UNITED STATES PATENT OFFICE.

CLAUD J. FORD, OF PORTLAND, OREGON, ASSIGNOR TO S. L. SAVIDGE, OF PORTLAND, OREGON.

MOUNTING FOR SHOCK-ABSORBERS.

1,374,997. Specification of Letters Patent. Patented Apr. 19, 1921.

Application filed April 19, 1919. Serial No. 291,379.

*To all whom it may concern:*

Be it known that I, CLAUD J. FORD, a citizen of the United States, residing at Portland, county of Multnomah, State of Oregon, have invented certain new and useful Improvements in Mountings for Shock-Absorbers, of which the following is a specification.

My invention relates to shock absorbers in general, and particularly to that type of such devices as are used upon automobiles as auxiliaries to the main body springs thereon.

The objects of my invention are to provide a device adaptable to automobile springs known as semi-elliptic or cantaliver springs; to provide a device adaptable to various types of shock absorbing springs, as flat springs, helical springs, and the like; and to provide a device easily assembled upon the automobile without alteration of either the automobile or the device.

I accomplish the above objects by means of the construction illustrated in the accompanying drawing, which is a part of this application for Letters Patent, like characters of reference indicating like parts throughout the several views thereof, and in which:

Figure 1 is a fragmentary side elevation of an automobile rear spring, and axle in section, with my device installed thereon.

Fig. 2 is a similar view, showing a modified shock absorbing spring.

Figs. 3, 4, 5 and 6 are detailed perspective views of various parts of my device, to be hereinafter described.

In general my device consists of a member secured transversely to the automobile axle and extending therefrom parallel to the main spring of the automobile, one end of said member being pivotally attached to the automobile body adjacent the main spring thereof, and the opposite end of said member being pivotally connected with the auxiliary shock absorbing spring and with the free end of the main automobile spring.

Said member 7 is preferably secured to the automobile axle 8 by bolts 9 passing through holes 10 in member 7, the position of said member 7 being preferably below the main automobile spring 11, and substantially parallel thereto.

The forward end of said member 7 is pivotally mounted adjacent the end of main spring 11 to body member 12, a preferred type of mounting consisting of a clip 15 having bolt holes 13 therein adapted to receive one of the main spring clip bolts 14, and downwardly projecting ears 16 adapted to have mounted thereon a cross rod 17 upon which is pivotally mounted the end 7$^a$ of member 7.

The opposite end of member 7 projects rearward of axle 8 and is turned upward as at 7$^b$, terminating in an end 7$^c$ similar to the opposite end 7$^a$, as shown in Fig. 6.

Pivotally mounted upon end 7$^c$ is a rocker which extends forwardly therefrom, and upon which is mounted the free end of the main automobile spring 11, and between which rocker and spring 11 the auxiliary shock absorbing spring is mounted.

One form of said rocker and shock absorbing spring is illustrated in Fig. 1, in which the rocker consists of a forwardly extending lever 18 having its forward end supported upon a helical spring 19, and pivotally connected with the free end of the main automobile spring 11 by links 20 and clip 21 secured to spring 11 by bolts 22, the spring 19 being seated upon spring 11 by means of spring seat 23 secured thereon.

A modified and preferred form of said rocker is that illustrated in Figs. 2 and 4, in which the rocker consists of a plate 24 having downwardly projecting ears 25 thereon with holes 26 in said ears adapted to receive a rod 27 therein, which rod is pivotally supported upon the end 7$^c$ of rocker 7.

Depending from the forward end of said plate 24 is a yoke 28 adapted to encompass the rear or free end of main spring 11, as shown in Fig. 2.

Forwardly extending from the plate 24, and secured thereto by bolts 29 in bolt holes 30, is the shock absorbing flat spring 31, which is disposed substantially parallel to the main spring 11 upon the side thereof opposite to member 7, the free end of said spring 31 being secured to the spring 11.

A preferred means of so securing the free end of spring 31 to spring 11 is illustrated in detail in Fig. 5, and consists of a stirrup or yoke having two members 32 adapted to receive spring 11 therebetween, and to be secured thereto by a rod 33 passed through suitable holes 34 in members 32; and having above members 32 a socket 35 into which the rear end of spring 31 is fitted.

In the above description of my device the terms rearwardly and forwardly are used in connection with the illustrations of the drawing, which is of a rear automobile spring disposed parallel to the car body, but it is evident that the front automobile spring may be mounted upon a similar device, and also such automobile springs as are disposed transversely of the automobile body.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. A shock absorber disposed between an automobile main spring and an automobile axle, and comprising a member transversely crossing said axle and secured thereto and disposed substantially parallel to and adjacent said automobile spring; means for pivotally attaching one end of said member to the automobile body; a rocker pivotally mounted upon the opposite end of said member; means for attaching the free end of said automobile spring to said rocker; an auxiliary spring seated upon said rocker; and means for attaching one end of said auxiliary spring to said automobile spring.

2. In a shock absorber disposed between an automobile spring and an automobile axle: a member secured to said axle and disposed across the same substantially parallel to said automobile spring; pivotal means for securing one end of said member to the body of the automobile; and yieldable means mounted upon the opposite end of said member for supporting the free end of said automobile spring.

3. In a shock absorber; a vehicle spring, a member adapted to be attached to a vehicle axle, and having portions thereof extending upon opposite sides of the point of said attachment; pivotal means for securing one end of one of said portions to the vehicle body; and yieldable means for mounting the free end of the vehicle spring upon the end of the other portion of said member.

4. A vehicle body member; a spring attached thereto; a vehicle axle adjacent the free end of said spring; a member rigidly secured to said axle; means for pivotally attaching said member to said vehicle body member; and means for yieldably mounting the free end of said spring upon said member.

5. A vehicle body member; a vehicle spring attached thereto; an axle; a member rigidly secured to said axle; pivotal connecting means between said member and said vehicle body member; a rocker mounted upon said member; means for securing the free end of said vehicle spring to said rocker; and an auxiliary spring between said rocker and said vehicle spring.

6. A mounting for a shock absorber comprising a plate having an arm extending therefrom, said plate being adapted to be secured to the axle of a vehicle, said arm being inclined upwardly with respect to said plate and provided at its end with a transverse sleeve, said plate having an extension offset oppositely to the inclination of said arm, said extension at its extremity being turned upwardly and constituting means adapted to have attached thereto the plate carrying the lever of a shock absorber, a second plate adapted to be secured to and carried by the vehicle body and having spaced ears embracing said sleeves and a pivot bolt carried by said ears and lying within the sleeve.

7. A mounting for a shock absorber comprising a plate adapted to be secured to the axle of a vehicle and having an arm extending therefrom and adapted to be connected with the body of a vehicle, said arm being inclined upwardly with respect to said plate, said plate having an extension projecting oppositely to the arm and offset oppositely to the inclination of the arm, said extension at its extremity being turned upwardly and constituting means adapted to have attached thereto the plate carrying the lever of a shock absorber.

8. In a shock absorber; a member transversely secured to a vehicle axle below the vehicle spring and substantially parallel to said spring; yieldable means to connect said member to the body of the vehicle; and yieldable means for mounting the free end of said spring upon said member.

9. In a shock absorber, a member transversely secured to a vehicle axle below the vehicle spring and substantially parallel to said spring; yieldable means to connect said member to the adjacent structure of the vehicle and yieldable means for mounting the free end of said spring upon said member.

In witness whereof I claim the foregoing as my own, I hereunto affix my signature in the presence of a witness at Portland, county of Multnomah, State of Oregon, this 8th day of April, 1919.

CLAUD J. FORD.

Witness:
C. F. BLAKE.